June 4, 1968 W. M. J. CAIRNS ET AL 3,386,538
INTERNAL SHOE DRUM BRAKES FOR VEHICLES
Filed Sept. 19, 1966 2 Sheets-Sheet 1
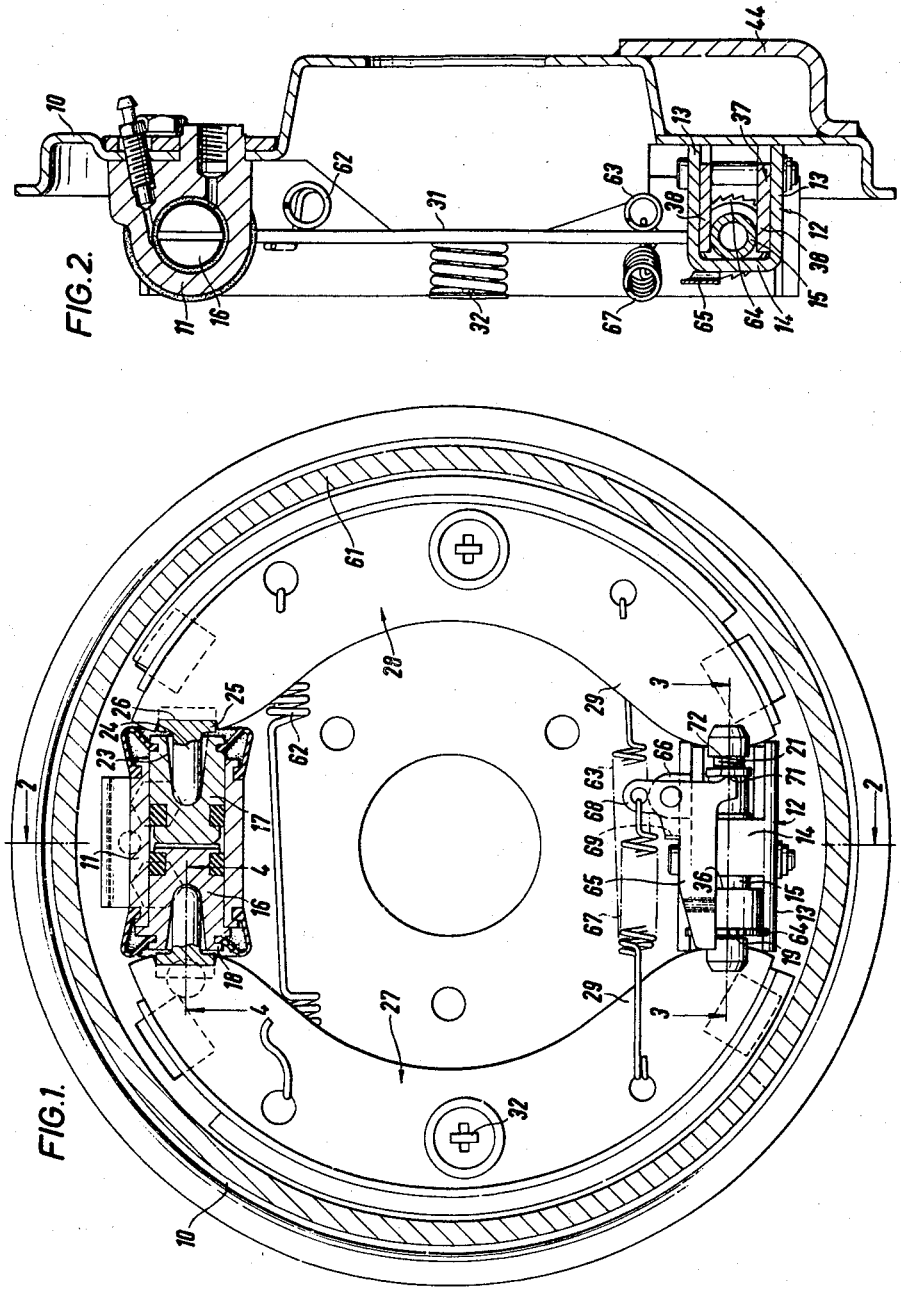
INVENTORS
Wallace M. J. Cairns
BY Leslie C. Chouings
Lawrence J. Winter
ATTORNEY June 4, 1968  W. M. J. CAIRNS ET AL  3,386,538

INTERNAL SHOE DRUM BRAKES FOR VEHICLES

Filed Sept. 19, 1966  2 Sheets-Sheet 2

INVENTORS
Wallace M. J. Cairns
BY Leslie C. Chouinga
Lawrence J. Winter
ATTORNEY

United States Patent Office 3,386,538
Patented June 4, 1968

3,386,538
INTERNAL SHOE DRUM BRAKES FOR VEHICLES
Wallace M. J. Cairns and Leslie C. Chouings, Warwickshire, England, assignors to Automotive Products Company Limited, Warwickshire, England
Filed Sept. 19, 1966, Ser. No. 580,219
Claims priority, application Great Britain, Sept. 28, 1965, 41,188/65
7 Claims. (Cl. 188—195)

ABSTRACT OF THE DISCLOSURE

An internal shoe drum brake for a vehicle wheel comprising a brake drum and a back plate, a pair of oppositely disposed brake shoes secured to said back plate and adapted to engage said brake drum including a leading brake shoe and a trailing brake shoe, liquid pressure wheel cylinder means disposed between one end of said shoes, a pair of piston means in said cylinder means adapted to act against said brake shoe ends to cause said shoe ends to engage said brake drum when a liquid pressure force is applied thereto, a brake shoe abutment housing disposed between the opposite ends of said leading and trailing brake shoes and in contact with said opposite brake ends, and resilient force applying means in contact with said abutment housing means and urging said housing means into engagement with the adjacent end of said leading shoe, and stop means on one of said piston means to limit the travel of said one piston means against said one end of said leading brake shoe, whereby the resistance of said resilient means will vary with the load supported by the vehicle wheel on which the brake acts and said stop means prevents further increase of the force applying load.

---

This invention relates to internal shoe drum brakes for vehicles, and has for its object to provide a brake in which the maximum braking torque which can be applied is varied automatically in dependence upon the load supported by the vehicle wheels.

According to the invention, in an internal shoe drum brake having two shoes which act respectively as leading and trailing shoes for at least the direction of drum rotation corresponding to forward movement of the vehicle, an abutment, against which the shoe acting as a leading shoe is urged by the drag of the drum when the brake is applied during forward movement of the vehicle is supported by resilient means the resistance of which will vary with the load supported by the vehicle wheel on which the brake acts, and a stop is provided to limit the travel of a thrust member acting to apply the said leading shoe to the drum so that, when the drag acting on the said leading shoe is sufficient to overcome the resilient means supporting the abutment, the thrust member engages the stop and prevents further increase of the applying force on the said shoe.

The invention is hereinafter described with reference to the accompanying drawings, in which:

FIGURE 1 is a front elevation with parts in section, of one form of internal shoe drum brake according to the invention;

FIGURE 2 is a section on the line 2—2 of FIGURE 1.

Figure 3:
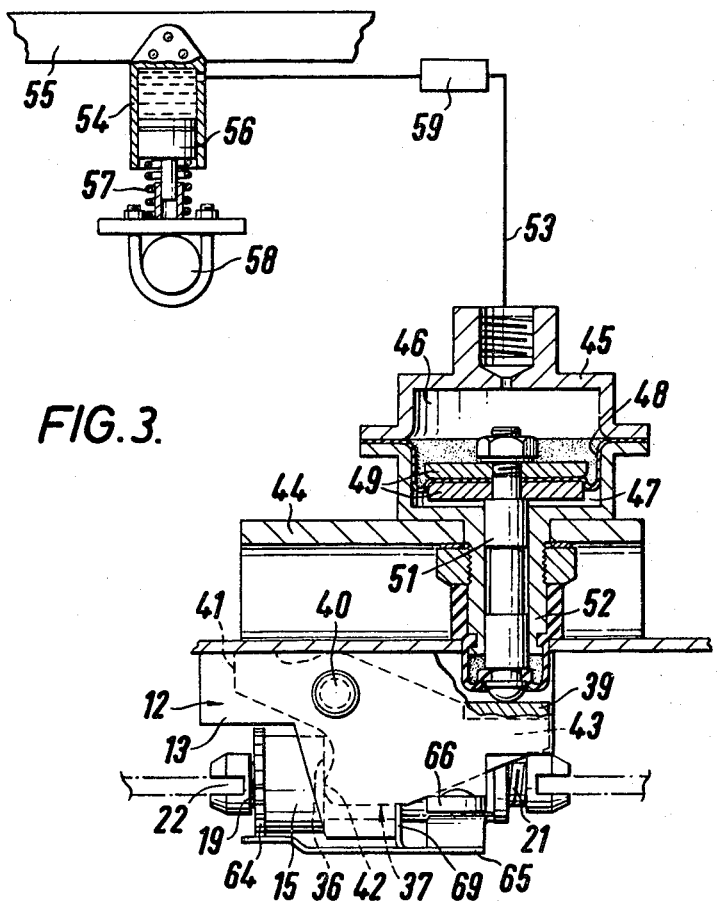
FIGURE 3 is a section on the line 3—3 of FIGURE 1 and includes a diagrammatic showing of means for applying the supporting force of the shoe abutment.

Referring to the drawing the brake comprises a backplate 10 or equivalent support on which are fixedly mounted, in diametrically opposed positions, a double-ended liquid pressure wheel cylinder 11 and a shoe abutment housing 12, the wheel cylinder 11 having its axis substantially normal to a radius of the backplate passing through its longitudinal centre, and the shoe abutment housing comprising two spaced parallel side members 13 normal to the plane of the backplate and lying in planes parallel to the wheel cylinder axis, the side members being connected one to the other by a bridge-piece 14. A sleeve 15, having internal right and left hand screw-threads respectively at its two ends, extends through the housing 12 and is free both to move in the direction of its axis and to rotate about its axis.

Two pistons 16 and 17 are slidably mounted one in each end of the wheel cylinder 11, the piston 16 having an external flange 18 at its outer end to limit its movement into the wheel cylinder, and the two pistons, when fully retracted into the wheel cylinder abut one against the other. Two screw-threaded tappets 19 and 21 are mounted one in each end of the sleeve 15, the heads of the said tappets being slotted diametrically as shown at 22. The pistons 16 and 17 are formed at their outer ends with tapered recesses 23 in which are mounted thrust rods 24 having rounded inner ends engaging the inner ends of the recesses so that the thrust rods are free for limited tilting movement relative to the pistons, the thrust rods 24 having heads 25 which are also formed with diametrical slots 26.

Two brake shoes 27 and 28 are each located at one end by the engagement of curved ends of their webs 29 in the slots 22 of the tappets 19 and 21 so that the sleeve 15 and tappets 19 and 21 form together a movable spacing member between those ends of the shoes. The shoes are located at their other ends by engagement of their webs in the slots 26 in the heads 25 of the thrust rods 24, the shoe webs 29 being notched to receive the heads 25. The shoes 27 and 28 are retained at their centres against abutment surfaces 31 on the backplate by spring-loaded steady pins 32.

Figure 4:
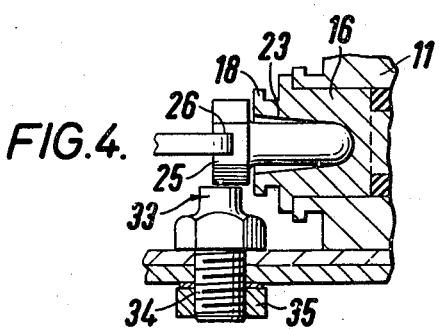
FIGURE 4 is a section of a detail, taken on the line 4—4 of FIGURE 1.

Outward movement of the piston 16 having the external flange 18 is limited by a stop 33 (FIGURE 4) mounted on the backplate 10, the stop 33 having a screw threaded stem 34 which passes through a hole in the backplate and is held in position by a nut 35.

The sleeve 15 is formed with an external shoulder 36 facing away from the end thereof in which the tappet 19 engaged by the shoe 27 abuts, and a lever member 37, comprising two parallel side plates 38 (FIGURE 2) connected together in spaced relation by a bridge-piece 39 (FIGURE 3), is pivotally mounted at 40 between the plates 13 of the shoe abutment housing 12, the side plates 38 lying one on each side of the sleeve 15. Each of the side plates 38 of the lever member 37 is shaped to provide, in effect, three lever arms. One of the said arms of each plate 38, shown at 41 in FIGURE 3, bears against the backplate 10, another arm 42 bears against the shoulder 36 on the sleeve 15, and the third arm 43 on the two plates are joined together by the bridge piece 39.

A bracket 44 secured to the exterior of the backplate 10 as shown in FIGURE 2 carries a cylindrical casing 45 divided into two chambers 46 and 47 by a flexible diaphragm 48 the central portion of which is clamped between two stiff discs 49 mounted on a stem 51 extending through a sleeve 52 integral with the casing 45 and having a rounded end which bears on the bridge-piece 39 of the lever member 37. The chamber 46 in the casing 45 is connected, by a conduit 53, to a cylinder 54 fixed to the body of a vehicle on which the brake is mounted, a part of said body being shown at 55. A piston 56 slidable in the said cylinder is urged inwardly of the cylinder 54 by a compression spring 57 taking its abutment on the mounting of the vehicle wheel with which the brake is associated, the said mounting being shown as a rear axle 58. The chamber 46, cylinder 54 and conduit 53 are filled with liquid, a restricting device 59 being arranged in the conduit 53 to damp out rapid fluctuations of pressure in the liquid due to road shocks. The other chamber 47 in the casing 45 is in communication with the atmosphere.

The brake shoes 27 and 28, which co-operate with a brake drum 61 (FIGURE 1), are urged inwardly away from the said drum by pull-off springs 62 and 63.

The sleeve 15 has a ring of ratchet teeth formed on a flange 64 at one end thereof, and a pawl 65 pivoted on a lug 66 carried by the housing 12, engages with the said ratchet teeth. The pawl 65 is urged by a tension spring 67, connected between a tail 68 on the said pawl and the shoe 27, in an anti-clockwise direction as shown in FIGURE 1, the movement of the pawl in that direction being limited by a projection 69 thereon engaging the side of the housing 12. The pawl 65 also includes an arm 71 which abuts against a second shoulder 72 on the sleeve 15, facing in the opposite direction to the shoulder 36. The pawl 65 co-operates with the ratchet teeth on the flange, in a manner hereinafter described, to provide automatic adjustment of the brake.

Mechanical expanding means (not shown) may be provided, in addition to the wheel cylinder 11, for applying the brake shoes to the drum, such mechanical expanding means being used, for example, to apply the brake for parking purposes.

The brake according to the invention is so mounted on a vehicle that the brake shoe 27 is the leading shoe for the direction of drum rotation corresponding to forward movement of the vehicle. When the brake is applied during such movement both wheel cylinder pistons 16 and 17 move outwardly and apply the shoes 27, 28 to the drum 61, the torque reaction on the leading shoe 27 being applied through the shoulder 36 on the sleeve 15 to the lever member 37 and acting on the said lever member in a direction opposite to the force exerted by the liquid pressure on the diaphragm 48. So long as the torque reaction of the shoe 27 is insufficient to overcome the force, due to the vehicle load, exerted on the diaphragm 48, the arm 41 of the lever member 37 is held by the pressure on the diaphragm 48 against the backplate 10, and the brake therefore acts as a normal leading-and-trailing shoe brake. If, however, the torque reaction becomes sufficient to overcome the force acting on the diaphragm 48 the lever member 37 moves about its fulcrum allowing the shoes 27, 28, the wheel cylinder pistons 16, 17 and the sleeve 15 all to move round in the direction of drum rotation until the flange 18 on the wheel cylinder piston 16 engages the stop 33. When such engagement takes place the torque exerted by the leading shoe cannot be further increased by increasing the applying pressure.

The force opposing movement of the lever member 37 clearly varies with the load supported by the wheel on which the brake is mounted, and consequently the maximum degree of braking which can be applied by the leading shoe depends on the said load.

Since the shoes, the wheel cylinder pistons and the sleeve all move together as one, when the force acting on the diaphragm 48 is overcome, there is no change in the pressure conditions in the wheel cylinder and no effect on the position or "feel" of the pedal or equivalent member by means of which the brakes are operated.

Any increase in the brake-applying pressure after the piston 16 has engaged the stop 18 will slightly increase the braking torque exerted by the trailing shoe 28 but, due to the low shoe factor of that shoe, this will not appreciably increase the total braking torque. Thus the maximum degree of braking which can be applied varies with the load on the vehicle wheel.

If the brake is applied while the vehicle is moving in the reverse direction, the shoe 28 acts as the primary shoe of a two-shoe servo combination, the torque reaction thereon being transmitted through the sleeve 15 and tappets 19 and 21 to the shoe 27 and causing it to act as the secondary shoe of the combination. The movement of the sleeve and tappets is applied through the shoulder 72 on the sleeve to the pawl 65, causing it to move over the ratchet teeth on the flange 64. If the movement is great enough, the pawl picks up a fresh ratchet tooth and, when the brake is released, turns the sleeve 15 in a direction to move the tappets outwardly and thus reduce the clearance between the brake shoes and the drum. The screw threads on the tappets 19 and 21 are preferably of different pitch to compensate for the fact that the lining of the leading shoe will wear at a greater rate than the lining of the trailing shoe.

It will be understood that the invention is not limited to the form of a brake specifically described herein, but includes any form of internal shoe drum brake having two shoes which act as leading and trailing shoes for the direction of drum rotation corresponding to forward movement of the vehicle, in which the leading shoe co-operates with an abutment capable of yielding when the torque reaction on the shoe reaches a predetermined value relative to the load on the wheel with which the brake is associated, and yielding of the abutment prevents further applying force from being applied to the said leading shoe. For example, the second brake shoe, which acts as a trailing shoe during forward movement, may have a positive anchorage so that it acts as a leading shoe during reverse movement.

The diaphragm 48 may be replaced by a piston slidable in a cylinder.

We claim:
1. An internal shoe drum brake for a vehicle wheel comprising a brake drum and a back plate, a pair of oppositely disposed brake shoes secured to said back plate and adapted to engage said brake drum including a leading brake shoe and a trailing brake shoe, liquid pressure wheel cylinder means disposed between one end of said shoes, a pair of piston means in said cylinder means adapted to act against said brake shoe ends to cause said shoe ends to engage said brake drum when a liquid pressure force is applied thereto, a brake shoe abutment housing disposed between the opposite ends of said leading and trailing brake shoes and in contact with said opposite brake ends, and resilient force applying means in contact with said abutment housing means and urging said housing means into engagement with the adjacent end of said leading shoe, and stop means on one of said piston means to limit the travel of said one piston means against said one end of said leading brake shoe, whereby the resistance of said resilient means will vary with the load supported by the vehicle wheel on which the brake acts and said stop means prevents further increase of the force applying load.

2. The brake of claim 1 wherein said resilient force applying means includes a diaphragm piston member.

3. An internal shoe drum brake of claim 2, wherein said diaphragm piston member forms one wall of a chamber connected to a variable volume chamber, and liquid pressure supply means communicate with said variable volume chamber whereby said pressure is dependent upon the load supported by the vehicle wheel.

4. The internal shoe drum brake of claim 3 wherein said abutment housing means includes a sleeve urged toward said opposite brake end a lever member is disposed between said sleeve and resilient means.

5. The internal shoe drum brake of claim 4 wherein said one piston means is one of two pistons and the other of said pistons acts on said trailing shoe.

6. The internal shoe drum brake of claim 5, wherein said abutment housing means includes two tappets one interposed between the sleeve and each of said brake shoes, and said tappets have respectively right-and-left hand screw threaded engagement with said sleeve so that rotation of said sleeve adjusts the spacing between said shoe ends engaging said spacing member.

7. The internal shoe drum brake of claim 6, wherein automatically actuated means are provided for rotating said sleeve by movement of said brake shoes.

References Cited
UNITED STATES PATENTS 2,498,438  2/1950  Du Rostu ---------- 188—195
3,338,351  8/1967  Lepelletier -------- 188—195

DUANE A. REGER, *Primary Examiner*.